(12) United States Patent
Cahill-O'Brien et al.

(10) Patent No.: US 9,268,391 B2
(45) Date of Patent: Feb. 23, 2016

(54) POWER MANAGEMENT DEVICE (71) Applicant: Itron, Inc., Liberty Lake, WA (US)

(72) Inventors: Barry Cahill-O'Brien, Spokane, WA (US); Johann de Jager, Waseca, MN (US)

(73) Assignee: Itron, Inc., Liberty Lake, WA (US)

( * ) Notice: Subject to any disclaimer, the term of this patent is extended or adjusted under 35 U.S.C. 154(b) by 368 days.

(21) Appl. No.: 13/839,223

(22) Filed: Mar. 15, 2013

(65) Prior Publication Data

US 2014/0281624 A1    Sep. 18, 2014

(51) Int. Cl.
G06F 1/32     (2006.01)
H02J 7/00     (2006.01)
H02J 9/00     (2006.01)

(52) U.S. Cl.
CPC .............. *G06F 1/3234* (2013.01); *H02J 7/007* (2013.01); *H02J 9/005* (2013.01)

(58) Field of Classification Search
CPC ........ G06F 1/263; G06F 1/3234; H02J 7/007; H02J 9/005; H02M 3/158
See application file for complete search history.

(56) References Cited

U.S. PATENT DOCUMENTS

| | | | |
|---|---|---|---|
| 6,246,677 | B1 | 6/2001 | Nap et al. |
| 2007/0063867 | A1 | 3/2007 | Fuller et al. |
| 2008/0307242 | A1* | 12/2008 | Qu ................................ 713/320 |
| 2009/0115384 | A1* | 5/2009 | Venes et al. ................... 323/280 |
| 2009/0243869 | A1 | 10/2009 | Sanderford, Jr. |
| 2011/0037324 | A1* | 2/2011 | Perper et al. .................. 307/140 |
| 2011/0062785 | A1 | 3/2011 | Odland et al. |

FOREIGN PATENT DOCUMENTS

WO    WO2009143287    11/2009

OTHER PUBLICATIONS

PCT Search Report and Written Opinion mailed Jun. 24, 2014 for PCT Application No. PCT/US14/26578, 14 Pages.

* cited by examiner

*Primary Examiner* — Dennis M Butler
(74) *Attorney, Agent, or Firm* — Lee & Hayes, PLLC (57) ABSTRACT

A power management device is adapted to reduce power consumption, particularly in battery-powered applications such as within a node in a utility network (e.g., in a gas, water, or other utility application). In one example, a low-current voltage regulator provides power to a processor during low-power "sleep" states. A high-current voltage regulator provides power to the processor, metrology devices and/or a radio during "awake" states. A buck-boost device may provide power to a transmitter during radio frequency (RF) transmissions. A max device may determine a greater of voltages output by a battery and the buck-boost device, and use the higher to power the high-current voltage regulator. The power management device may include a state machine, which may include several states and operations to perform within each state. In one state, the processor enters a sleep state prior to recovery of battery voltage after a transmission state.

17 Claims, 5 Drawing Sheets

POWER MANAGEMENT DEVICE

BACKGROUND

Power management of battery powered devices is important to achieve adequate battery life. In a utility environment (e.g., a gas and/or water meter), expected battery life may be twenty years. To achieve such an operational period, it is important to limit current draw and to efficiently use the current that is drawn. Accordingly, processors spend larger amounts of time in sleep modes, and radio transmission periods are minimized. However, increasing demands for data (e.g., to provide encryption) have resulted in a need for new and better means to conserve power and extend battery life.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

The disclosure describes example techniques for the construction and operation of a power management device, which may be configured for use with a battery-powered node (e.g., metering device) within a utility network. In one non-limiting example, a processor and/or microprocessor is powered by a lower-current-providing voltage regulator when in a "sleeping" mode, and by a higher-current-providing voltage regulator when an active or "awake" mode. Both voltage regulators may provide similar voltage output, but differ in the amount of current provided and their efficiency of operation. In the example, the lower-current-providing regulator is more efficiently operated to power a limited subset of lower current operations, such as those associated with a sleep period of a processor. The higher-current-providing regulator is configured to provide sufficient current for higher-current operations such as radio reception, operation of metrology devices, etc.

In operation, the processor may be awakened, such as by a clock, timer or counting circuit. In the awake mode, a power management device provides the processor with power from the higher-current voltage regulator and turns off the lower-current voltage regulator. In one example, the power management device may use a "max" circuit to determine a higher of the battery voltage and voltage from a buck-boost device, and utilize the higher to power the higher-current voltage regulator. In the awake mode, the processor may perform tasks such as operation of a radio receiver to receive messages, operation of metrology devices, management of metrology data and other functions. At some point, the processor may need to transmit information, such as metrology data (e.g., data indicating gas or water consumption by a customer). To provide the necessary power to the radio frequency (RF) transmitter, the power management device utilizes the buck-boost device. As the transmission begins, the voltage level of the battery may exceed the requirements of the radio transmitter, and the buck-boost device may "buck" or reduce the voltage level of the power to a prescribed level. However, continued transmission may lower the voltage of the battery below the prescribed level, and the buck-boost device may perform a "boost" function, wherein the voltage level is increased to the prescribed level. After the conclusion of the radio transmission, the processor may enter a sleep period, thereby conserving power. The power management device may utilize a "max" device to determine a greater of a voltage of the battery and a voltage of the buck-boost device. When the voltage of the battery recovers to the programmed voltage level of the buck-boost device, the buck-boost is turned off and the processor continues in a sleep state powered by the lower-current-providing voltage regulator.

Example System and Techniques

Figure 1:
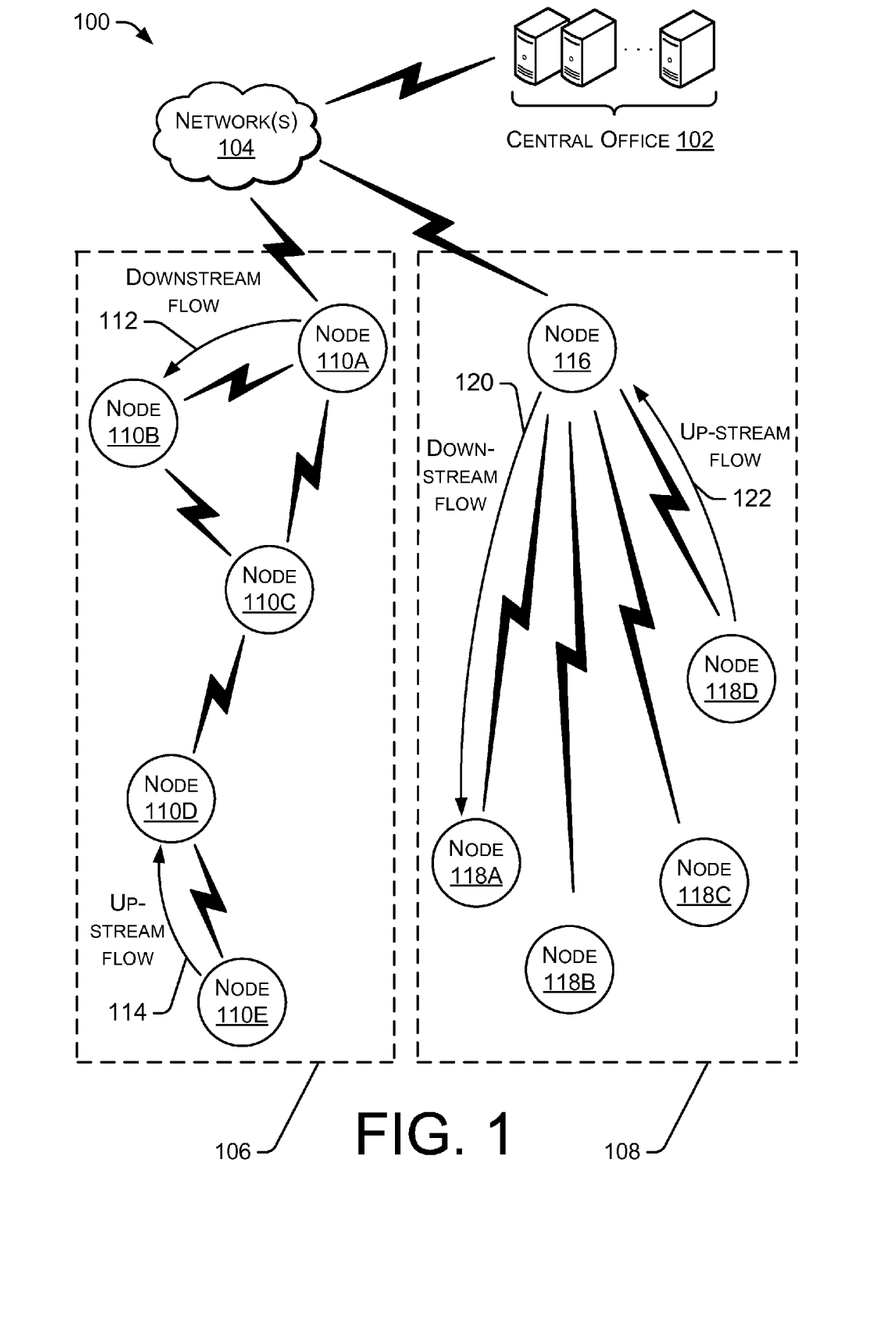
FIG. 1 is a block diagram showing an example network environment, including a plurality of network nodes configured for performing techniques including power management in a utility infrastructure environment.

FIG. 1 is a block diagram showing an example network 100 including a plurality of nodes, at least some of which may be battery powered and may include a power management device constructed and/or operated according to the techniques discussed herein. The network 100 may include a central office 102 configured for communication with nodes in the network. Thus, the central office 102 may communicate over a network 104, such as the Internet, with one or more nodes in a network associated with a utility system. In a two-way communication environment, the central office 102 may receive data from, and transmit data to, the nodes of the network.

The utility network 100 may include nodes that are battery operated, and which are part of systems delivering gas, water, sewer, steam or other utility services to customers. The utility network 100 may be configured as a network(s), according to any desired strategy or architecture. FIG. 1 shows examples of both a mesh network 106 and a star network 108, which are but two network architectures that may utilize nodes that may include the power management device described herein.

The mesh network 106 includes a plurality of nodes 110A-110E, which represents any number of nodes. The nodes may be battery powered or may utilize power provided by a utility system, and may utilize the power management device described herein. The nodes may be associated with meters, transformers, switches, substations, any supervisory control and data acquisition (SCADA) device, etc., and more generally with any circuit and/or system element with which one- or two-way communication is desired. Within the mesh network 106, the nodes 110 communicate with each other to relay information in a downstream direction 112 and/or an upstream direction 114.

Within the star network 108, a central node 116 communicates with one or more downstream nodes, represented by nodes 118A-118D. The star network may include downstream flows 120 of information and/or upstream flows 122 of information.

Example Network Node

Figure 2:
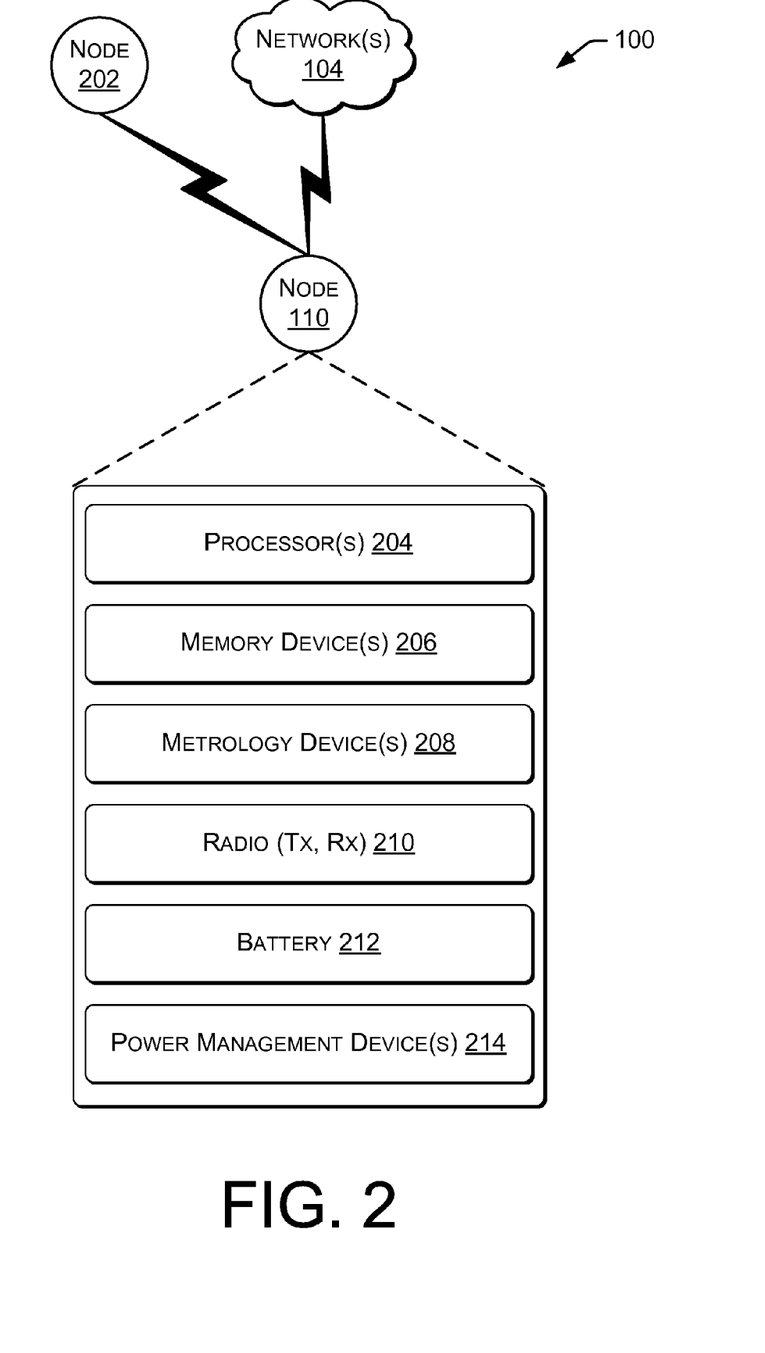
FIG. 2 is a block diagram showing an example node having a power management device configured for operation in a utility network environment.

FIG. 2 is a block diagram showing an example node 110 in the utility network environment 100. The node 110 may communicate over radio frequency (RF) links with one or more other nodes 202 or through the network 104. In the example shown, the node 110 may include one or more processors 204 in communication with one or more memory devices 206. The processor 204 may control one or more metrology devices 208, such as meters or other devices used to measure consumption of utility services (e.g., gas, water, steam, sewer, etc.). The processor 204 may also control operation of a radio 210, which may have transmitter and/or receiver functionality. In one example, the processor 204 may use the radio 210 to communicate with the node 202 and/or network 104, and ultimately with the central office 102. Such communication may provide information regarding consumption data obtained from the metrology device(s) 208 and stored in the memory 206. The entire node 110 may be powered by a battery 212. The demands on the battery may be considerable. In particular, the battery may be expected to power the components 204-210 over an extended lifetime, such as 20 years. Accordingly, a power management device 214 assists the node 110 and battery 212 to perform as desired and/or according to product requirement specifications.

Example Power Management Device

Figure 3:
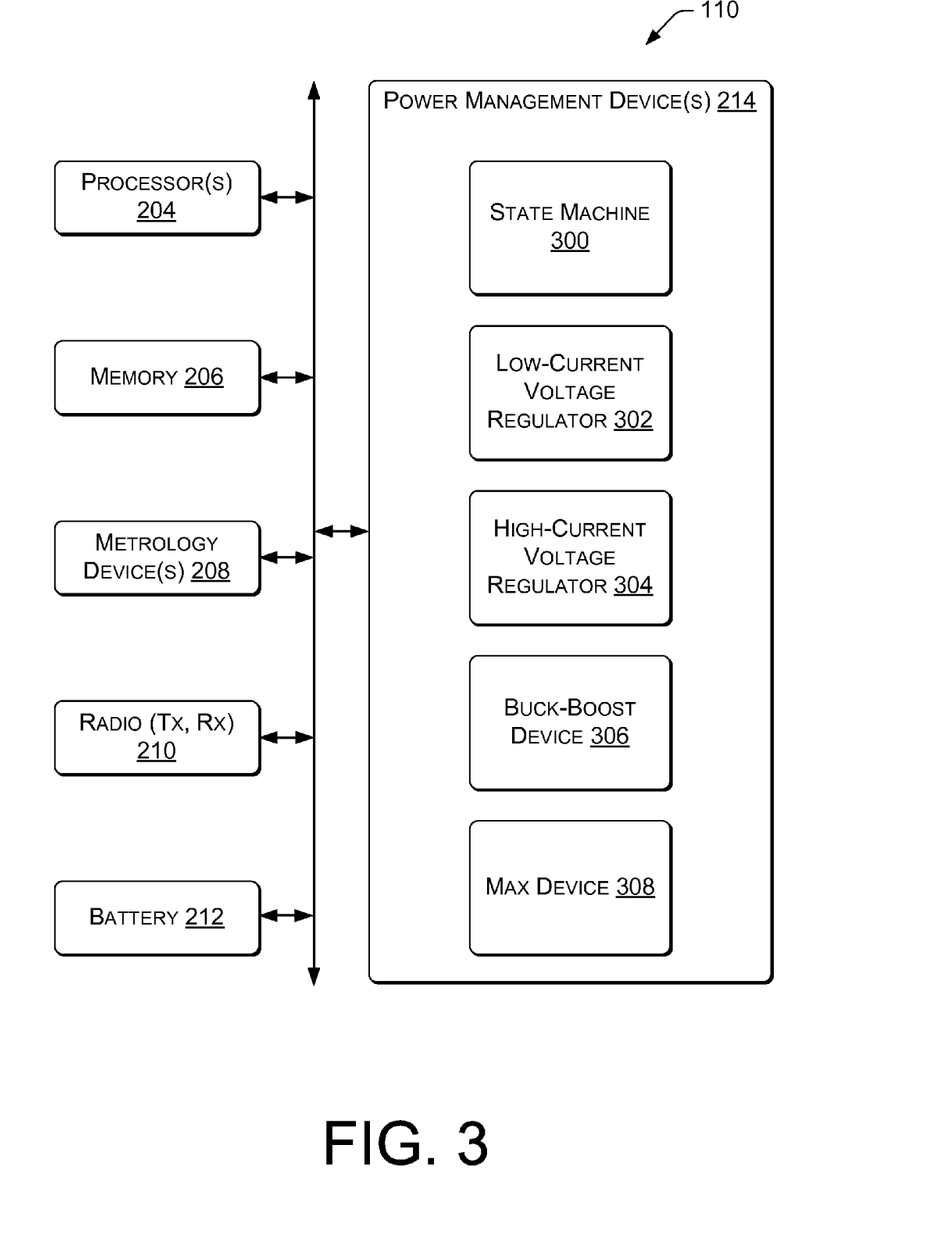
FIG. 3 is a block diagram showing example detail of a power management device configured for operation in a node in a utility network environment.

FIG. 3 is a block diagram showing an example internal configuration of a battery-powered node 110 within a utility network. In the example shown, the node 110 may include a processor 204 in communication with memory 206, metrology devices 208 and a transceiver radio 210. The node may be powered by a battery 212 managed at least in part by the power management device 214.

In the example of FIG. 3, the power management device 214 includes a state machine 300, which is representative of management software, firmware, circuitry and/or hardware (e.g., application specific integrated circuit (ASIC) device or a field programmable gate array (FPGA)). The state machine 300 may recognize a plurality of states, modes or conditions, and move between the various states according to changes in events. Example changes include changes in a voltage level of the battery, operation of the transmitter, scheduled metrology measurements, a change between processor sleep and awake states, etc. Accordingly, the state machine may assist in the management of the node 110, and may even control or manage aspects of the node when the processor is in either awake or sleep states. The overall power consumption of the node 110 is less with the state machine 300 (and more generally, the power management device 214) controlling operation of the node than if the processor was required to remain awake for additional periods to perform similar functionality.

A low-current regulator 302 may be used to provide smaller amounts of current in certain states, modes or during conditions (e.g., such as "sleep" periods) when power consumption is less. For example, the processor 204 may spend a considerable percentage of the time in a sleep mode, to avoid excessive current consumption. It may awaken from the sleep mode at intervals or upon appropriate conditions to perform functions such as metrology, radio operation and others. However, during the sleep mode, the low-current regulator 302 may provide the processor 204 and/or other components with low current levels regulated at appropriate voltages. The low-current regulator 302 may perform the regulation in a very efficient manner. That is, the low-current regulator 302 is efficient, and its power consumption is quite low (e.g., providing less than 1 uA and consuming approximately 0.03 uA).

A high-current voltage regulator 304 may be used to provide larger amounts of current for use in certain states, modes or during conditions (e.g., such when the processor 204 is awake) when activity requires power in excess of that which may be provided by the low-current regulator 302. For example, 15 mA may be provided by the high-current voltage regulator 304, and 100 uA may be consumed. The low-current voltage regulator 302 and the high-current voltage regulator 304 may provide output voltages that are similar and/or of ranges that are overlapping. However, the current output may vary substantially. Also, the high-current voltage regulator 304 may not be as efficient as the low-current regulator and may consume more power during operation. The high-current voltage regulator 304 may provide power to the metrology device(s) 208, and to the processor 204 and/or memory device 206 in the awake mode. The high-current voltage regulator 304 may also provide power to the radio 210, particularly in the lower-power consuming receive mode. In one example, only one of the low-current voltage regulator 302 and the high-current voltage regulator 304 are operational at any given time.

A buck-boost device 306 may be included in the power management device 214 to provide current to devices during times when the voltage of the battery dips below required and/or preferred levels. The buck-boost device 306 may provide power to the high-current voltage regulator 304 and/or the radio 210 (e.g., when in transmit mode). The buck-boost 306 may receive power from the battery 212 and provide regulated power at one or more programmable voltage levels to one or more devices. In one example, the buck-boost 306 may be programmed to provide current at 3 volts to the radio 210, such as during periods of RF transmission. The buck-boost 306 may perform a "buck" functionality by reducing voltage when input voltage from the battery exceeds 3 volts. In contrast, the buck-boost may perform a "boost" functionality by increasing voltage when input voltage from the battery is below 3 volts. The output of the buck-boost may be provided to the radio 210, the high-current voltage regulator 304 or other device.

A max device 308 may be included in the power management device 214 to determine a maximum between two input voltages. In a first example, the max device 308 may receive input from the battery 212 and the buck-boost 306. The device having the higher voltage output may be used to provide power to a power-consuming device, such as the high-current voltage regulator 304. In a second example, the output voltage of the battery may be reduced after a radio transmission is completed. The max device 308 may receive inputs from the battery 212 and the buck-boost 306. As the output voltage of the battery recovers, it will eventually provide a voltage greater than the programmed output voltage of the buck-boost 306. At that time, the max 308 may indicate this event to the state machine 300 (or other controlling device), and the buck-boost device 306 may be turned off. This will allow the battery to provide power to devices, as needed, in a more efficient manner than possible by the buck-boost device 306.

Example Power Management Timing

Figure 4:
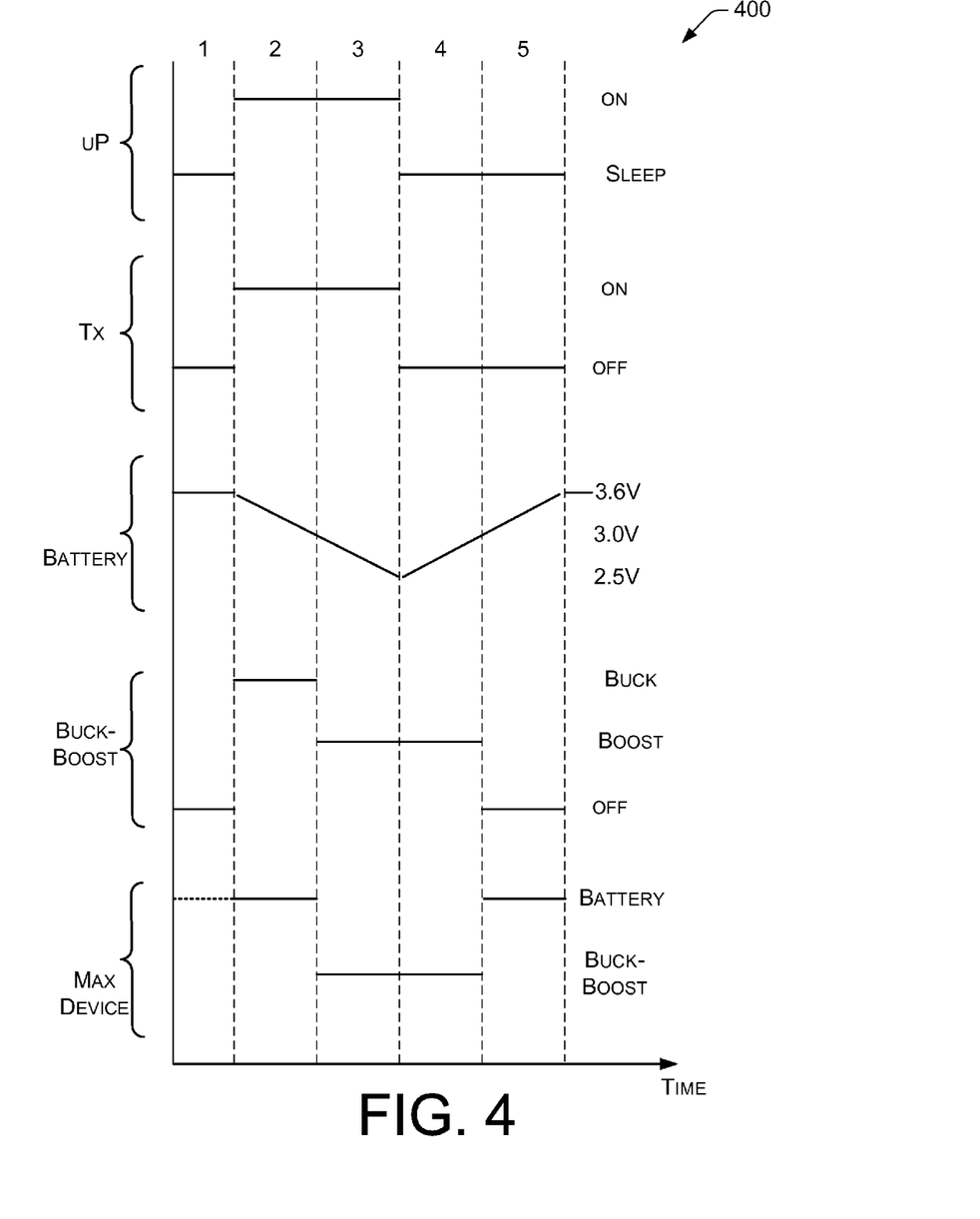
FIG. 4 is a timing diagram showing an example relationship between various components in the example utility network device.

FIG. 4 is a timing diagram 400 showing an example relationship between various components of the node 110 of FIG. 3. Five (5) states or modes are shown in the example drawing. The states are intended to be representative and illustrative of a multi-mode node in a utility network. However, the states are not intended to represent required states or to represent an exhaustive discussion of possible states.

In a first state or mode, the processor is in sleep mode. In sleep mode, only very minimal tasks are performed, such as timing or counting operations that may be used by the processor to wake itself up at an appropriate time. The transmitter (Tx) is off. The battery is at 3.6 volts, which indicates good battery health and conditions. The buck-boost device is off.

The max device may be turned off, or may indicate that the battery has a higher voltage level than the buck-boost device.

In the second state, the processor and the transmitter are turned on. The battery voltage begins to fall, due to the load imposed by the transmission. The buck-boost, which may be powered by the battery, and which in turn may provide power to the transmitter, is in the buck mode. That is, the buck-boost "bucks" down the voltage of the battery to the 3 volts needed by the transmitter. The max device indicates that the battery has greater voltage than the programmed output of the buck-boost. Accordingly, the high-current voltage regulator, metrology devices, the RF receiver and/or other devices may receive power from the battery.

In the third state, the battery voltage has fallen below three volts. Accordingly, the buck-boost has transitioned to a "boost" mode, and the max device now indicates that the output of the buck-boost device is at a voltage higher than the battery. Accordingly, the buck-boost device may continue to be used to operate the transmitter, and may be used to operate the high-current voltage regulator, metrology devices and/or other devices, if operating.

In the fourth state, the transmitter is turned off, and the processor enters the "sleep" state. This is advantageous, since the processor is able to cut power consumption immediately after conclusion of transmission. The battery voltage begins to recover, but the max device continues to indicate that the battery voltage is below the 3 volts of the buck-boost, and the buck-boost may be used to provide current to components.

In the fifth state, the battery has recovered to at least the 3-volt level. Accordingly, the max device indicates that the battery exceeds the programmed voltage of the buck-boost. The buck-boost device may then be turned off.

Example State Machine and Methods of Operation

Figure 5:
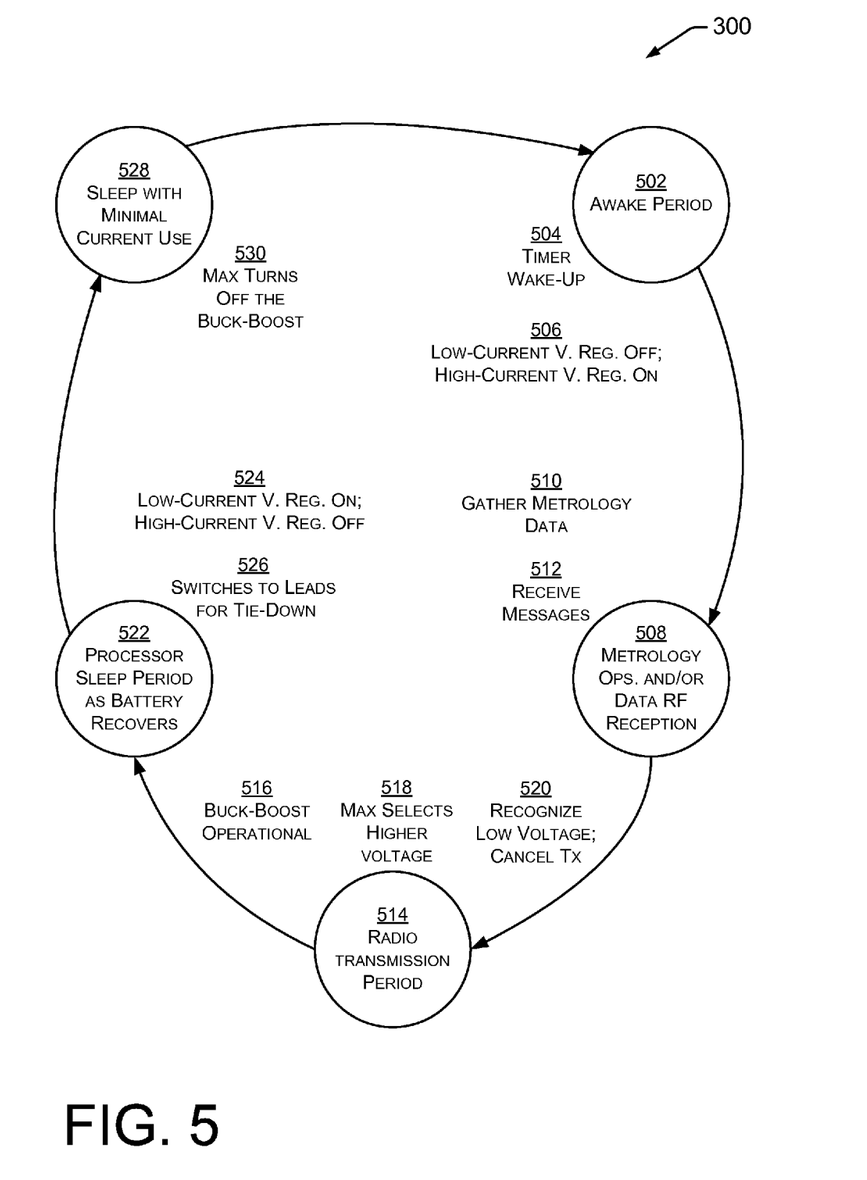
FIG. 5 is a state diagram showing operation of an example state machine configured for operation within a node in a utility network.

FIG. 5 is a state diagram showing example operation of a state machine 300. The state machine 300 is representative of controllers, control circuits, executable software and/or processor-implemented methods configured for operation within (or in conjunction with) a power management device in a battery-powered node in a utility network. In some examples, the state machine techniques discusses herein may be performed by execution of software defined in memory and/or by operation of an application specific integrated circuit(s) (ASIC) or portion of the power management device 214. Thus, the state machine shown is representative of logical constructs generally. The memory 206 (see FIGS. 2 and 3) may comprise computer-readable media and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves.

At state 502, the processor is an "awake" period. The awake period 502 may be entered in response to a timer wake-up operation 504 or similar, which allows the processor to wake itself up. Alternatively, an external clock or counter may be used. At operation 506, the awake period 502 may be accompanied by a change in voltage regulation. In the example shown, the low-current voltage regulator which provided current to the processor during a previous sleep state is turned off, and a higher-current voltage regulator is turned on. The higher-current voltage regulator is required to operate the processor, memory, metrology devices and/or other devices.

At state 508, the awake period may be utilized to perform metrology operations and/or data reception. In one example, the awake period may be used to allow the processor to operate metrology equipment, obtain and/or record metrology data at operation 510 and/or listen to incoming radio messages at operation 512. The metrology devices, memory devices, radio receiver, etc., may be powered by the higher-current voltage regulator (e.g., regulator 304 of FIG. 3).

At state 514, all or part of the awake period may include a radio transmission. The radio transmitter may require greater power than the higher-current voltage regulator is able to provide, and at operation 516 the buck-boost device may be activated to provide power to the radio and/or transmitter. As the radio transmission progresses, the voltage of the battery may fall. Accordingly, the buck-boost may transition from "buck" mode to "boost" mode as it continues to power the transmitter at a prescribed voltage. At operation 518, the max device may switch from indicating that the battery has higher voltage to indicating that the buck-boost has higher voltage. In response to transition of the max device, the buck-boost device may substitute for the battery as a power source to the higher-current voltage regulator. At operation 520, the radio transmission period may be cancelled prior to completion if a low voltage situation is recognized. In one example, extremely cold weather may cause the battery to have lower voltage and/or power, and may precipitate the failure. The low voltage situation may endanger the processor, which may fail without adequate voltage. Accordingly, the radio transmission state 514 may end prematurely, and state 522 may begin early, to allow battery recovery.

At state 522, the transmission ends and a processor sleep period is entered. In one example, the processor enters a portion of a sleep period during which the battery recovers. At operation 524, the state machine may turn the lower-current voltage regulator on and turn the high-current voltage regulator off. The lower-current voltage regulator is sufficient to maintain operation of the processor in the sleep state. At operation 526, one or more switches may be used to tie power supply leads to ground (or other voltage potential) to avoid current leakages that may otherwise result.

At state 528, the battery voltage has recovered and the processor continues to sleep. Because the battery voltage has recovered, the max device 308 of the power management device 214 is able to turn off the buck-boost. Turning off the buck-boost reduces battery consumption. In this state, the entire node 110 utilizes minimal power. The processor may continue to sleep until it awakens due to an internal (or external) timer, clock, counter or similar.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims

What is claimed is:

1. A power management device, comprising:
a first voltage regulator to provide regulated power to at least one device external to the power management device;
a second voltage regulator to provide regulated power to the at least one device external to the power management device, wherein the second voltage regulator is configured to provide greater current levels than the first voltage regulator;
a controller to switch between operation of the first voltage regulator and the second voltage regulator; and
a switch to tie a power output lead to a potential that prevents floating when the power output lead is not providing power.

2. The power management device of claim 1, additionally comprising:
a buck-boost device to provide a programmable output voltage; and
a max device to determine whether voltage from a battery or voltage provided by the buck-boost device is higher and to select the higher of the voltage of the battery and the voltage from the buck-boost device to supply the second voltage regulator.

3. A utility meter comprising the power management device of claim 1, wherein the controller is configured to:
switch to the first voltage regulator to provide power for sleep functions; and
switch to the second voltage regulator to provide power for metrology functions.

4. A utility meter comprising the power management device of claim 1, the utility meter comprising:
a transmitter;
a buck-boost device, configured to:
receive power from a battery; and
power the transmitter;
a processor configured to:
manage operation of the transmitter; and
enter a sleep mode after a transmission is sent by the transmitter and before recovery of the battery; and
a max device to turn off the buck-boost device upon recovery of the battery after the transmission.

5. A utility meter comprising the power management device of claim 1, the utility meter comprising a state machine including states comprising:
an awake period during which the controller is configured to switch from operation of the first voltage regulator to the second voltage regulator;
a radio transmission period during which a transmitter is powered by a buck-boost device;
a processor sleep period during which a battery recovers and the buck-boost device is operational; and
a sleep-with-minimal-current-use period during which the buck-boost device is turned off.

6. A utility meter comprising the power management device of claim 1, the utility meter comprising a state machine to perform state changes responsive to conditions comprising:
a drop in battery voltage during which power is provided to the second voltage regulator using a buck-boost device; and
an initiation of a sleep period during which a power output lead is switched to prevent floating and current leaks.

7. A utility meter comprising the power management device of claim 1, the utility meter comprising a state machine to perform state changes responsive to conditions, the conditions comprising a low voltage situation and cancelling a transmission.

8. A utility meter, comprising:
a metrology device to obtain metrology information;
a transmitter to transmit the metrology information;
a processor to operate the metrology device and/or the transmitter;
a battery to provide power;
a buck-boost device to receive the power from the battery and to provide power to the transmitter;
a power management device, comprising a state machine and states comprising:
a sleep period as the battery recovers in which the processor is put to sleep; and
a sleep period with minimal current use in which the buck-boost device is turned off;
a first voltage regulator to provide regulated power to devices within the utility meter;
a second voltage regulator to provide regulated power to devices within the utility meter, wherein the second voltage regulator is configured to provide greater current levels than the first voltage regulator at a similar voltage and wherein only one of the first voltage regulator or the second voltage regulator is operational at a time; and
a max device to:
determine whether voltage of the battery or voltage of the buck-boost device is higher; and
select the battery or the buck-boost device to supply power to the second voltage regulator based on the determination.

9. The utility meter of claim 8, wherein the buck-boost device is turned off at least in part in response to a comparison of an output voltage of the battery and an output voltage of the buck-boost device, wherein the comparison is made by the max device.

10. The utility meter of claim 8, wherein the states additionally comprise an awake period during which a low-current-providing voltage regulator is turned off and a high-current providing voltage regulator is turned on.

11. The utility meter of claim 8, wherein the states additionally comprise a radio transmission period during which the transmitter is powered using the buck-boost device.

12. The utility meter of claim 8, wherein the power management device is configured to:
switch to the first voltage regulator to provide power for sleep functions; and
switch to the second voltage regulator to provide power for metrology functions.

13. A utility meter, comprising:
a metrology device to obtain metrology information;
a transmitter to transmit the metrology information;
a battery to provide power;
a buck-boost device, configured to:
receive power from the battery; and
power the transmitter;
a processor to manage operation of the transmitter and to enter a sleep mode after a transmission sent by the transmitter and before recovery of the battery;
a max device to turn off the buck-boost device upon recovery of the battery after the transmission; and
one or more switches to prevent floating of power output leads not providing power.

14. The utility meter of claim 13, the utility meter comprising a state machine and states comprising:

an awake period during which the controller is configured to switch from operation of a first voltage regulator to a second voltage regulator;

a radio transmission period during which a transmitter is powered by a buck-boost device;

a processor sleep period during which a battery recovers and the buck-boost device is operational; and a sleep-with-minimal-current-use period during which the buck-boost device is turned off.

15. The utility meter of claim 13, the utility meter comprising a state machine and states comprising:

switch to a first voltage regulator to provide power for sleep functions; and switch to a second voltage regulator to provide power for metrology functions.

16. The utility meter of claim 13, additionally comprising a state machine to perform state changes responsive to conditions comprising:

a drop in battery voltage and providing power to the second voltage regulator using the buck-boost; and an initiation of a sleep period and switching a power output lead to prevent floating and current leaks.

17. A power management device, comprising:

a first voltage regulator to provide regulated power to at least one device external to the power management device;

a second voltage regulator to provide regulated power to the at least one device external to the power management device, wherein the second voltage regulator is configured to provide greater current levels than the first voltage regulator;

a controller to switch between operation of the first voltage regulator and the second voltage regulator;

a buck-boost device to provide a programmable output voltage; and a max device to determine whether voltage from a battery or voltage provided by the buck-boost device is higher and the select the higher of the voltage of the battery and the voltage from the buck-boost device to supply the second voltage regulator.

* * * * *